(12) United States Patent
Ke et al.

(10) Patent No.: US 8,804,640 B2
(45) Date of Patent: Aug. 12, 2014

(54) METHOD AND APPARATUS FOR OBTAINING HYBRID AUTOMATIC REPEAT REQUEST INFORMATION OF COMMON CONTROL CHANNEL

(75) Inventors: Yazhu Ke, Shenzhen (CN); Xiang Cheng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 180 days.

(21) Appl. No.: 13/258,795

(22) PCT Filed: Aug. 10, 2010

(86) PCT No.: PCT/CN2010/075861
§ 371 (c)(1),
(2), (4) Date: Sep. 22, 2011

(87) PCT Pub. No.: WO2011/041961
PCT Pub. Date: Apr. 14, 2011

(65) Prior Publication Data
US 2012/0170527 A1 Jul. 5, 2012

(51) Int. Cl.
*H04W 72/04* (2009.01)
*H04L 1/18* (2006.01)
*H04W 88/08* (2009.01)
*H04W 28/04* (2009.01)
*H04W 88/12* (2009.01)

(52) U.S. Cl.
CPC .............. *H04W 72/04* (2013.01); *H04W 88/08* (2013.01); *H04W 28/04* (2013.01); *H04W 88/12* (2013.01); *H04L 1/1896* (2013.01); *H04L 1/1812* (2013.01)
USPC ........................................................ 370/329

(58) Field of Classification Search
USPC ................ 370/479, 322, 328–329, 341–342, 370/348–349, 395.3, 437, 443, 450, 524
See application file for complete search history.

(56) References Cited

U.S. PATENT DOCUMENTS

2004/0001472 A1* 1/2004 Kwak et al. ................... 370/342
2007/0116002 A1* 5/2007 Nakamata ..................... 370/394

(Continued)

FOREIGN PATENT DOCUMENTS

| CN | 1791264 A | 6/2006 |
| CN | 101489305 A | 7/2009 |
| CN | 101547440 A | 9/2009 |
| KR | 20060022580 A | 3/2006 |

*Primary Examiner* — Kwang B Yao
*Assistant Examiner* — Syed Bokhari
(74) *Attorney, Agent, or Firm* — Christopher L. Parmelee; Walker & Jocke

(57) ABSTRACT

The present invention discloses a method and an apparatus for obtaining the Hybrid Automatic Repeat Request (HARQ) information of a CCCH, wherein the method for obtaining the HARQ information of the CCCH comprises: a base station receiving a request message from a Radio Network Controller (RNC), wherein the request message is used to indicate the HARQ information used by the CCCH; the base station obtaining the HARQ information used by the CCCH according to the request message. According to the present invention, the base station obtains the HARQ information of the CCCH according to the message from the radio network controller, thus which is convenient for both the base station and a UE to know exactly the corresponding relationship between the CCCH logical channel and the HARQ used by the CCCH logical channel, thereby guaranteeing Node B to perform decoding correctly and improving the reception success rate of signal and data.

5 Claims, 2 Drawing Sheets

(56) References Cited

U.S. PATENT DOCUMENTS

| | | |
|---|---|---|
| 2009/0040969 A1* | 2/2009 | Kim et al. .................... 370/328 |
| 2010/0040088 A1* | 2/2010 | Terry ............................ 370/479 |
| 2010/0103899 A1* | 4/2010 | Kwak et al. ................... 370/329 |
| 2013/0121242 A1* | 5/2013 | Pani et al. ..................... 370/328 |

* cited by examiner

METHOD AND APPARATUS FOR OBTAINING HYBRID AUTOMATIC REPEAT REQUEST INFORMATION OF COMMON CONTROL CHANNEL

FIELD OF THE INVENTION

The present invention relates to the communication field, and in particular to a method and apparatus for obtaining the Hybrid Automatic Repeat Request (HARQ) information of a common control channel

BACKGROUND OF THE INVENTION

With the evolution of the mobile communication system, the service quality of service supplied to the user, which affects service performance and also determines the user's satisfaction with the service, has become the first object of the operators. A key aspect for improving the quality of service of the user is the time delay when establishing the connection and distributing channel, and there is the service of relatively frequent small data package, so it is required to consider how to work with the common channel in a more effective way, for example, reducing the signaling delay of uplink and downlink.

To reduce the signaling delay of uplink, the following aspects need to be considered:

(1) reduce the waiting time of user plane and control plane in IDLE mode and in CELL_FACH state, Cell_PCH state as well as URA_PCH state;

(2) increase the peak rate of the CELL_FACH state;

(3) decrease the switching delay among idle mode, CELL_FACH state, CELL_PCH/URA_PCH state, and CELL_DCH state.

In order to achieve the above object, High Speed Uplink Packet Access (HSUPA) method can be introduced into idle mode and CELL_FACH state; using high speed uplink packet access technology in idle mode and CELL_FACH state is referred to as uplink enhanced CELL_FACH technology in the present invention.

The basic principle of the uplink enhanced CELL_FACH technology is as follows: the sending principle of random access still uses that of random access process of PRACH, but the channel type is changed, namely, in IDLE mode and CELL_FACH state, logic channels, such as Enhanced Dedicated Channel (E-DCH), Common Control Channel (CCCH)/Dedicated Control Channel (DCCH)/Dedicated Traffic Channel (DTCH) and so on, can be mapped to the E-DCH for sending.

The Iub port of the current 3GPP protocol defines the uplink common E-DCH MAC (Medium Access Control) flows to be used in idle mode and CELL_FACH state, wherein each uplink common E-DCH MAC flow comprises multiple common E-DCH MAC-d flow information, and the common E-DCH MAC-d flow information comprises the following information: E-DCH MAC flow power offset, maximum number of retransmissions and whether PDU among different MAC flows can be multiplied into one MAC-i PDU. The common E-DCH MAC-d flow information is used in DCCH and DTCH logic channel, and therefore it can be known that the common E-DCH MAC flow information used by CCCH logic channel is not contained in the interfaces defined by the current 3GPP protocol, thus it is impossible for Node B to know the HARQ profile information used on the CCCH logic channel sent by a UE, thereby it may cause Node B fail to properly receive the data on a CCCH logic channel.

Currently, there have been no effective solutions to solve the problem in the related art that the HARQ information used by the CCCH channel cannot be obtained.

SUMMARY OF THE INVENTION

The present invention is proposed considering the problem in the related art that the HARQ information used by the CCCH channel cannot be obtained. Thus the main object of the present invention is to provide a method and an apparatus for obtaining the HARQ information of a CCCH to solve the above-mentioned problem.

In order to achieve the above-mentioned object, one aspect of the present invention is to provide a method for obtaining the Hybrid Automatic Repeat Request (HARQ) information of a Common Control Channel (CCCH).

The method for obtaining the HARQ information of a CCCH according to the present invention comprises: a base station receiving a request message from a Radio Network Controller (RNC), wherein the request message is used to indicate the HARQ information used by the CCCH; and the base station obtaining the HARQ information used by the CCCH according to the request message.

In order to achieve the above object, another aspect of the present invention is to provide an apparatus for obtaining the HARQ information of a CCCH.

The apparatus for obtaining the HARQ information of a CCCH according to the present invention comprises: a receiving module, configured to receive a request message from the Radio Network Controller (RNC), wherein the request message is used to indicate the HARQ information used by the CCCH; and an obtaining module, configured to obtain the HARQ information used by the CCCH according to the above request message.

According to the present invention, the base station obtains the Hybrid Automatic Repeat Request (HARQ) information of the Common Control Channel (CCCH) according to the message from the Radio Network Controller (RNC), thus it is convenient for both the base station (Node B) and a UE to know exactly the corresponding relationship between the CCCH logical channel and the HARQ information used by the channel, thereby guaranteeing Node B to perform decoding correctly and improving the reception success rate of signal and data.

BRIEF DESCRIPTION OF THE DRAWINGS

The drawings illustrated herein provide a further understanding of the present invention and form a part of the present application. The exemplary embodiments and the description thereof are used to explain the present invention without unduly limiting the scope of the present invention, wherein.

DETAILED DESCRIPTION OF THE EMBODIMENTS

The present invention will be further illustrated hereinafter in conjunction with the exemplary embodiments and accompanying drawings. It needs to be noted that the embodiments and the features of the embodiments in the present application can be combined with each other under the circumstances that there is no conflict.

In view of the problem in the related art that the HARQ information used by the CCCH channel cannot be obtained, the present invention provides a method and an apparatus for obtaining the HARQ information of a CCCH. According to the solution provided by the present invention, a base station receives the Hybrid Automatic Repeat Request (HARQ) information of a Common Control Channel (CCCH) according to the signal from a radio network controller, thus it is convenient for both the base station (Node B) and a UE to know exactly the corresponding relationship between the CCCH logical channel and the HARQ information used by the channel, thereby guaranteeing Node B to perform decoding correctly and improving the reception success rate of signal and data.

Figure 1:
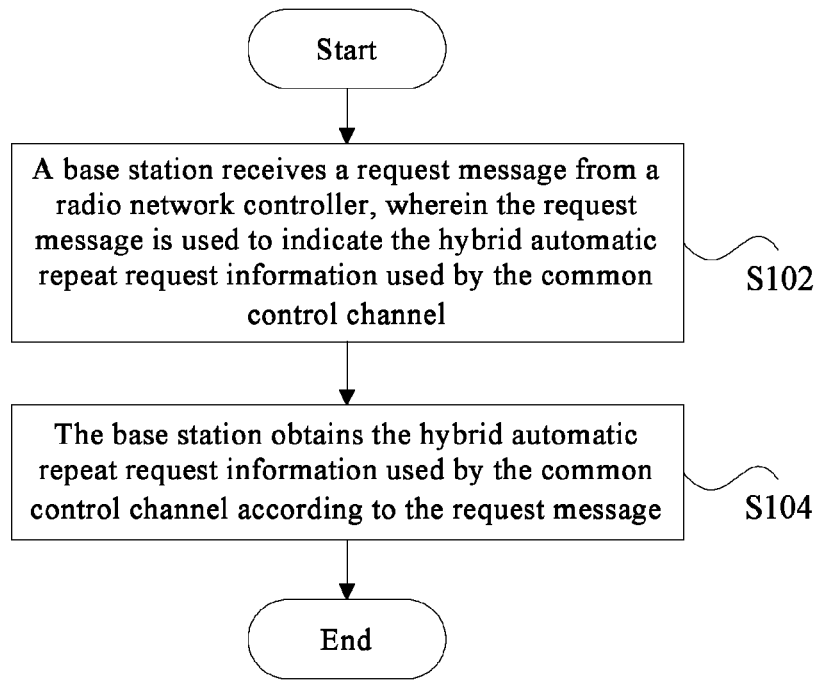
FIG. 1 is a flowchart of a method for obtaining the HARQ information of a CCCH according to the embodiments of the present invention.

According to the embodiments of the present invention, a method for obtaining the HARQ information of a CCCH is provided. As shown in FIG. 1, the method comprises the following steps.

S102, a base station receives a request message from a Radio Network Controller (RNC), wherein the request message is used to indicate the HARQ information used by the CCCH.

S104, the base station obtains the HARQ information used by the CCCH according to the request message.

Preferably, the above request message may carry a common E-DCH MAC flow identifier. After receiving the request message, the base station obtains the Media Access Control (MAC) flow identifier of the Common Enhanced Dedicated Channel (E-DCH) corresponding to the CCCH from the request message. Then the base station obtains the HARQ information corresponding to the identifier according to the above common E-DCH MAC flow identifier.

Preferably, the above request message may directly carry the HARQ information used by the CCCH. Correspondingly, after receiving the request message, the base station directly obtains the HARQ information used by the CCCH from the request message.

Preferably, the HARQ information used by the CCCH includes at least one of the following: the E-DCH HARQ power offset and the maximum number of retransmissions for E-DCH.

Embodiment I

Figure 2:
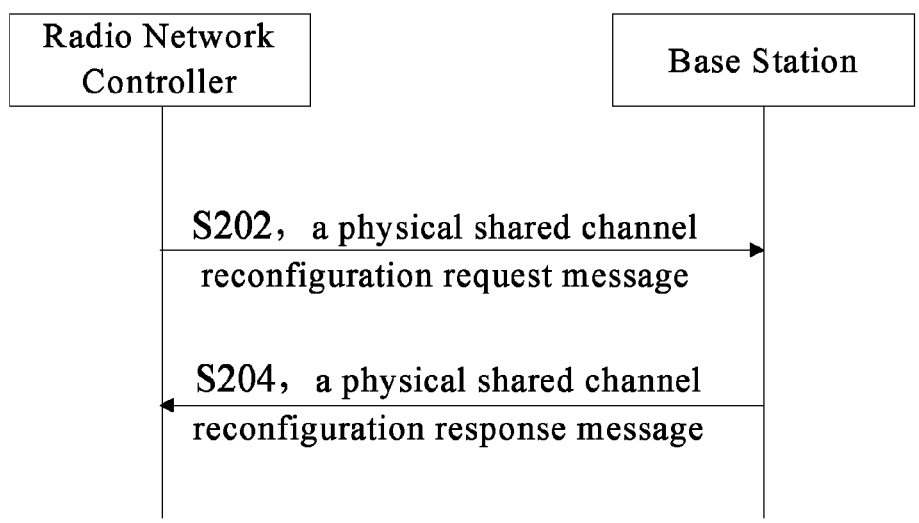
FIG. 2 is a specific flowchart of a method for obtaining the HARQ information of a CCCH according to Embodiment I of the present invention.

FIG. 2 is a specific flowchart of a method for obtaining the HARQ information of a CCCH according to Embodiment I of the present invention. As shown in FIG. 2, the base station obtaining the HARQ information used by the CCCH according to the request message from a Radio Network Controller (RNC) specifically comprises the following steps.

Step S202, the radio network controller sends a physical shared channel reconfiguration request message to the base station (Node B), wherein the physical shared channel reconfiguration request message carries the common E-DCH MAC flow identifier corresponding to the CCCH logic channel (CCCH Common E-DCH MAC-d Flow ID).

Step S204, after obtaining the common E-DCH MAC flow identifier corresponding to the CCCH logic channel from the physical shared channel reconfiguration request message, the base station sends a physical shared channel reconfiguration response message back to the radio network controller.

As the common E-DCH MAC flow identifier in the system corresponds to the HARQ information, after obtaining the common E-DCH MAC flow identifier corresponding to the CCCH logic channel, the base station can find the HARQ information corresponding to the identifier according to the common E-DCH MAC flow identifier, namely, the base station can know the HARQ information used by the CCCH logic channel. The base station herein may save the mapping relationship between the common E-DCH MAC flow identifier and the HARQ information in advance.

Preferably, the HARQ information used by the above CCCH includes at least one of the following: the E-DCH HARQ power offset and the maximum number of retransmissions for E-DCH.

Embodiment II

Figure 3:
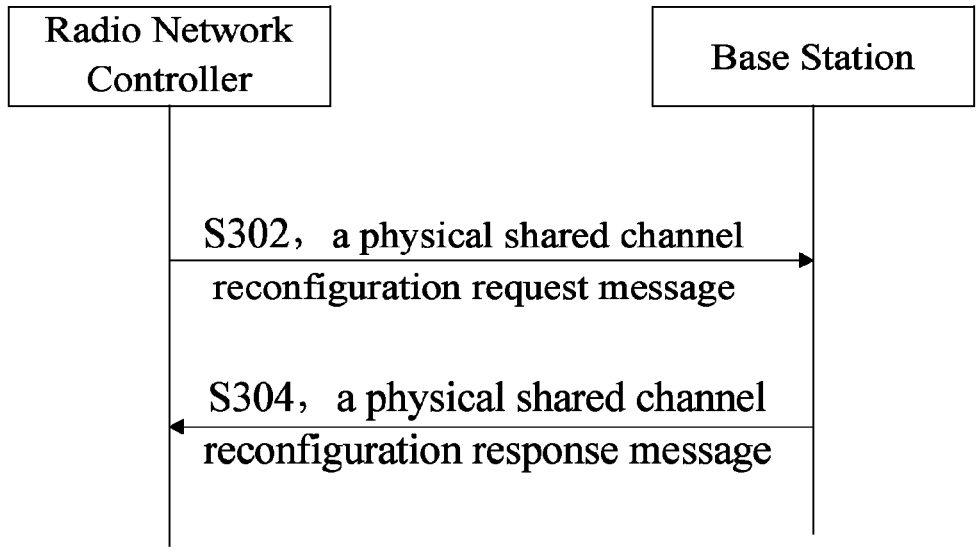
FIG. 3 is a specific flowchart of a method for obtaining the HARQ information of a CCCH according to Embodiment II of the present invention.

FIG. 3 is a specific flowchart of a method for obtaining the HARQ information of a CCCH according to Embodiment II of the present invention. As shown in FIG. 3, the base station obtaining the HARQ information used by the CCCH according to the request message from a Radio Network Controller (RNC) specifically comprises the following steps.

Step S302, the radio network controller sends a physical shared channel reconfiguration request message to the base station, wherein the request message carries the HARQ information used by the CCCH logic channel, and the HARQ information includes at least one of the following: E-DCH HARQ power offset (E-DCH HARQ Power Offset FDD) and Maximum Number of Retransmissions for E-DCH.

Step S304, after obtaining the HARQ information used by the CCCH logic channel from the physical shared channel reconfiguration request message, the base station sends a physical shared channel reconfiguration response message back to the radio network controller.

According to the present invention, the base station obtains the Hybrid Automatic Repeat Request (HARQ) information of the Common Control Channel (CCCH) from a radio network controller, thus it is convenient for both the base station (Node E) and the UE to know exactly the corresponding relationship between the CCCH logical channel and the HARQ information used by the channel, thereby guaranteeing Node B to perform decoding correctly and improving the reception success rate of signal and data.

In the embodiments of the present invention, an apparatus for obtaining the HARQ information of a CCCH is provided.

Figure 4:
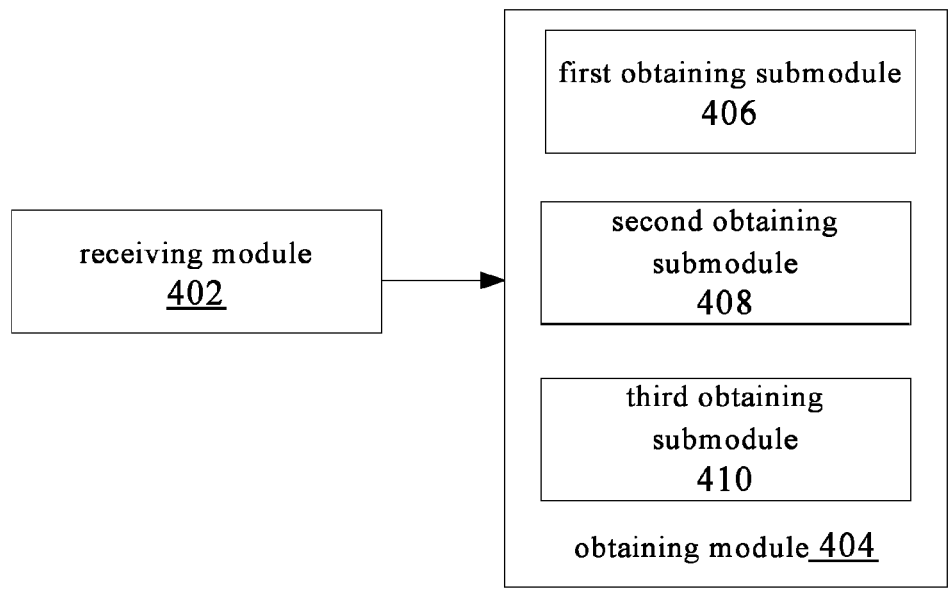
FIG. 4 is a structure diagram of an apparatus for obtaining the HARQ information of a CCCH according to the embodiments of the present invention.

FIG. 4 is a structure diagram of an apparatus for obtaining the HARQ information of a CCCH according to the embodiments of the present invention. As shown in FIG. 4, the apparatus can be applied to the base station, and the apparatus may comprises: a receiving module 402, configured to receive a request message from the Radio Network Controller (RNC), wherein the request message is used to indicate the HARQ information used by the CCCH; and an obtaining module 404, configured to obtain the HARQ information used by the CCCH according to the request message.

The obtaining module comprises: a first obtaining submodule 406, configured to obtain the Media Access Control (MAC) flow identifier of the common Enhanced Dedicated Channel (E-DCH) corresponding to the CCCH from the request message, wherein the request message carries the common E-DCH MAC flow identifier; and a second obtaining submodule 408, configured to obtain the HARQ information corresponding to the identifier according to the common E-DCH MAC flow identifier.

Preferably, the obtaining module may further comprise: a third obtaining submodule 410, configured to obtain the HARQ information used by the CCCH from the request message, wherein the request message carries the HARQ information used by the CCCH.

Preferably, the above request message may carry the common E-DCH MAC flow identifier. After receiving the request message, the receiving module 402 of the base station obtains, via the first obtaining submodule 406, the Media Access Control (MAC) flow identifier of the common Enhanced Dedicated Channel (E-DCH) corresponding to the CCCH from the request message.

As the common E-DCH MAC flow identifier in the system corresponds to the HARQ information, after obtaining the common E-DCH MAC flow identifier corresponding to the CCCH logic channel, the second obtaining submodule 408 obtains the HARQ information corresponding to the identifier according to the common E-DCH MAC flow identifier. For example, the second obtaining submodule 408 can find the HARQ information corresponding to the identifier according to the common E-DCH MAC flow identifier, namely, the base station can know the HARQ information used by the CCCH logic channel. The base station herein may save the mapping relationship between the common E-DCH MAC flow identifier and the HARQ information in advance.

Preferably, the above request message may directly carry the HARQ information used by the CCCH. Correspondingly, after receiving the request message, the receiving module 402 of the base station informs the third obtaining submodule 410 to directly obtain the HARQ information used by the CCCH from the request message.

The HARQ information used by the CCCH herein includes at least one of the following: E-DCH HARQ power offset and maximum number of retransmissions for E-DCH.

Preferably, the above request message is a physical shared channel reconfiguration request message.

Preferably, after obtaining the HARQ information used by the CCCH according to the above request message, the apparatus in the above embodiment sends a response message to the RNC, wherein the response message comprises the physical shared channel reconfiguration response message.

According to the present invention, the base station obtains the Hybrid Automatic Repeat Request (HARQ) information of the Common Control Channel (CCCH) from a radio network controller, thus it is convenient for both the base station (Node E) and the UE to know exactly the corresponding relationship between the CCCH logical channel and the HARQ information used by the channel, thereby guaranteeing Node B to perform decoding correctly and improving the reception success rate of signal and data.

It needs to be noted that the steps shown in the flowchart of the figures can be performed in a computer system, such as, a series of computer executable commands. Furthermore, although logic sequence is suggested in the flowchart, under certain circumstances, the flow shown or described can be executed in a sequence different with the sequence suggested.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise cover any modification, equivalent substitution and improvement within the spirit and principle of the present invention.

What is claimed is:

1. A method for obtaining the Hybrid Automatic Repeat Request (HARQ) information of a Common Control Channel (CCCH), comprising: a base station receiving a request message from a Radio Network Controller (RNC), wherein the request message is used to indicate the HARQ information used by the CCCH, wherein the request message carries a common Enhanced Dedicated Channel (E-DCH) Media Access Control (MAC) flow identifier, wherein the request message is a physical shared channel reconfiguration request message; the base station obtaining the common E-DCH MAC flow identifier corresponding to the CCCH from the request message; the base station obtaining the HARQ information used by the CCCH corresponding to the common E-DCH MAC flow identifier according to the common E-DCH MAC flow identifier obtained from the request message, wherein the HARQ information used by the CCCH includes at least one of the following: an E-DCH HARQ power offset and a maximum number of retransmissions for E-DCH wherein the request message is a physical shared channel reconfiguration request message.

2. The method according to claim 1, wherein the request message carries the HARQ information used by the CCCH.

3. The method according to claim 1, wherein after the base station obtains the HARQ information used by the CCCH according to the request message, the method further comprises:
the base station sending a response message to the RNC, wherein the response message comprises a physical shared channel reconfiguration response message.

4. An apparatus for obtaining the Hybrid Automatic Repeat Request (HARQ) information of a Common Control Channel (CCCH), located by a base station, and comprising: a receiving module, configured to receive a request message from the Radio Network Controller (RNC), wherein the request message is used to indicate the HARQ information used by the CCCH and the request message is a physical shared channel reconfiguration request message, wherein the request message carries a common Enhanced Dedicated Channel (E-DCH) Media Access Control (MAC) flow identifier; and an obtaining module, configured to obtain the common E-DCH MAC flow identifier corresponding to the CCCH from the request message and configured to obtain the HARQ information used by the CCCH corresponding to the common E-DCH MAC flow identifier according to the common E-DCH MAC flow identifier obtained from the request message, wherein the HARQ information used by the CCCH includes at least one of the following: an E-DCH HARQ power offset and a maximum number of retransmissions for E-DCH.

5. The apparatus according to claim 4, wherein the request message carries the HARQ information used by the CCCH.

* * * * *